United States Patent [19]

Sugie

[11] Patent Number: 4,519,081
[45] Date of Patent: May 21, 1985

[54] FACSIMILE COMMUNICATION METHOD WITH ANTI-ECHO STRATEGY

[75] Inventor: Masatoshi Sugie, Zama, Japan

[73] Assignee: Ricoh Co., Ltd., Japan

[21] Appl. No.: 393,304

[22] Filed: Jun. 29, 1982

[30] Foreign Application Priority Data

Jun. 29, 1981 [JP] Japan .................. 56-102063

[51] Int. Cl.³ .............................. H04M 1/36
[52] U.S. Cl. ........................ 371/57; 371/47; 358/257
[58] Field of Search .......... 364/200, 900; 371/57, 371/47; 358/257, 256, 264

[56] References Cited

U.S. PATENT DOCUMENTS

| | | | |
|---|---|---|---|
| 3,441,665 | 4/1969 | Wuensch | 358/257 |
| 3,914,537 | 10/1975 | Perreault et al. | 358/257 |
| 4,000,371 | 12/1976 | Ogawa | 358/257 |
| 4,296,439 | 10/1981 | Teramura et al. | 371/57 |
| 4,296,440 | 10/1981 | Rosenheck | 358/257 |

Primary Examiner—Jerry Smith
Assistant Examiner—Michael R. Fleming
Attorney, Agent, or Firm—Guy W. Shoup

[57] ABSTRACT

In a facsimile communication method capable of preventing receipt of an echo of data being transmitted, a preamble-preceded frame is used as a data to be transmitted, and the frame is allowed to be received only when its preceding preamble has been received. For this purpose, the total time length of the preamble-preceded frame being transmitted is monitored. If it is shorter than a predetermined time length, a number of flags as required are added to the end of preamble-preceded frame, thereby ensuring that the total time length of transmitting the data is always longer than the predetermined time length. In this manner, it is ensured that an echo of data being transmitted returns only while transmission of the data is in progress and is thus not received.

5 Claims, 12 Drawing Figures

FACSIMILE COMMUNICATION METHOD WITH ANTI-ECHO STRATEGY

BACKGROUND OF THE INVENTION

1. Field of the Invention

This invention relates to a facsimile communication method and in particular to a digital facsimile communication method capable of preventing the occurrence of false operation induced by echo.

2. Description of the Prior Art

As shown in FIG. 1a, in the case of conducting a facsimile communication through the public telephone lines, a calling station A first places a call by dialing as indicated by the dotted line. In response thereto, a called station B returns a CED (Called Station Identification) signal and then a DIS (Digital Identification) signal to the calling station A. In the case where the calling station A is to function as a transmitting station, the calling station A transmits a DCS (Digital Command) signal and then a phase-adjustment and training signal to the called station B, which, then, returns a CFR (Confirmation to Receive) signal to the calling station A as a response. Then, the calling station A transmits a FAX (or Message) signal, and, at the end of the message signal, one of EOM (End of Message), EOP (End of Procedure) and MPS (Multi-Page) signals is transmitted. Thereafter the called station B returns a message confirmation signal to the calling station A thereby completing a single facsimile communication procedure.

Although not shown in the drawings, in the case where the called station B is to function as a transmitter, when the called station B transmits a DIS signal, the calling station A returns a DTC (Digital Transmit Command) signal as a response. In succession, the called station B transmits a DCS signal and then a phase-adjustment and training signal. Then, upon returning of a CFR signal from the calling station A, a message signal is transmitted.

In accordance with the CCITT recommendations, as shown in FIG. 1b, there is a case in which the calling station A transmits a DIS signal in response to CED and DIS signals transmitted from the called station B after establishing a call between the calling station A and the called station B by dialing at the calling station A. In this case, since there is no original document to be transmitted at the calling station A, the called station B transmits a DCS signal if there is an original document to be transmitted or terminates facsimile communication if there is no original document to be transmitted.

As shown in FIG. 2, the facsimile transmission procedure recommended by CCITT (International Telegraph and Telephone Consultative Committee) includes Phase A: Call establishment,
Phase B: Pre-message procedure,
Phase C1: Inmessage procedure,
Phase C2: Message transmission,
Phase D: Post-message procedure, and
Phase E: Call return.

FIG. 3 is a flow chart showing the steps to be carried out at the receiver side in the phases B and C. It is to be noted that in FIG. 3 each step is identified by a reference numeral. As shown, after sending a CED signal, the receiver transmits a DIS signal at step 2 and determines at step 3 whether or not it has received a response from the transmitter. In the case where no response has been received, it proceeds to step 4 from where it proceeds to a tonal procedure (in this case, both of the transmitting and receiving stations are operated manually) if a GC (Group Command) signal has been received at step 4 or to step 5 if a GC signal has not been received. Then, having tried three times at step 5, it proceeds to other procedure, or after elapsing time T1 at step 6, a DCN (Disconnect) signal is sent to disconnect the transmission line.

On the other hand, if the receiver is in receipt of a response from the transmitter in response to a DIS signal, it proceeds to step 15 where the response received is checked as to whether or not it is a DTC signal. If it is, the process proceeds to D whereby the station functions as a transmitter to carry out facsimile transmission; whereas, if it is not a DTC signal, the process moves onto step 16 where the response received is checked as to whether it is a DIS signal. If it is a DIS signal, the process proceeds to E whereby an original document to be transmitted is checked and transmission is carried out; whereas, if it is not, the process proceeds to step 17 where the response received is checked as to whether it is a DCS signal. If it is not a DCS signal, the process proceeds to F to check whether it is one of EOP, EOM and MPS signals or to establish another procedure such as switching to a telephone by supplying a warning signal to the operator. If it is, in fact, a DCS signal, the process proceeds to step 18 to receive a TCF (Training Check) signal and then to step 19 from where, if the phase-adjustment and training check is good, the process proceeds to step 20 to transmit a CFR signal; on the other hand, if the training check is not good, the process proceeds to step 21 to transmit a FTT (Failure to Train) signal.

Then the process goes to step 11 to check whether or not the next command has been received. If negative, it proceeds to step 12 and if a message carrier is received within the delaying time period T2, it proceeds through step 14 to steps 23 and 24 where MODEM Training is carried out and then a message is received. On the other hand, if no carrier is received within the delaying time period T2, it proceeds to step 13 where the transmission line is disconnected.

If a facsimile message is to be transmitted over a long distance, e.g., from one country to another, the transmission line becomes very long so that impedance could be mismatched to produce the problem of echo interference. For this reason, an echo suppressor having the switch structure as shown in FIG. 4 is provided as connected to an ordinary transmission line. Describing the operation of the echo suppressor shown in FIG. 4, initially, both of the switches of the echo suppressor are closed to allow transmission of signals in both directions. Upon passage of the first signal, one of the switches is switched open after elapsing a predetermined delay time period to prevent the echo signal from passing therethrough. However, in the case of bidirectional data communication, the head portion of the data could be lost by the echo suppressor thereby hindering to transmit a correct signal to the other station in communication. Under the circumstances, according to the recommendations made by CCITT with respect to facsimile communication, during the call establishment step of phase A, the called station returns a CED signal, i.e., a disable tone of 2,100 Hz, to hold the echo suppressor inoperative.

In facsimile communication, especially over a long distance, echo signals are often generated. For example, as shown in FIG. 5a, when a calling station sends out a facsimile control signal comprized of a preamble PRA and a frame FRM, it will receive an echo signal of the control signal after a certain time lag, as shown in FIG. 5b. If such an echo signal has reached the calling station faster than the response signal, i.e., DCS signal in the case of FIG. 5b, from the called station, the calling station will accept the received signal at time G and therefore the calling station will receive the signal same in contents as the signal sent out by itself before receiving the DCS signal issued from the called station.

As shown in FIG. 6, the HDLC (High Level Data Link Control Procedures) frame structure is used in the binary code signal which is the standard digital facsimile signal system. In this frame structure, as shown in FIG. 6a, binary code information is always preceded by an 1 second-long preamble. Further, as shown in FIG. 6b, the binary code information is comprised of several frames such as a digital (DG) frame, a called terminal identification (RID) frame, and a non-standard facilities frame. Still further, each frame is comprised of a collection of several fields such as flag (F), address (ADR), control (CTL), facsimile control (DIS), facsimile information (FAX) and frame check (CHKF).

As shown in FIGS. 5a and 5b upon completion of sending out of a frame subsequent to a preamble at time G, the calling station accepts a receiving signal and thus when such a receiving signal is an echo signal, its frame will be processed as valid information by the calling station. Now, let us suppose that an echo signal is generated when the called station has sent out a DIS signal upon entering into phase B after sending out a CED signal for call establishment in phase A. If such an echo signal has reached the called station faster than a DCS signal issued from the calling station, then the same procedure as shown in FIG. 1b will follow, in which the calling station sends out a DIS signal in response to the DIS signal from the called station.

FIG. 7 is a time chart which contains an echo signal of the DIS signal supplied from the called station. When the called station sends out a DIS signal comprised of a preamble and a frame as shown in FIG. 7 (B1), it reaches the calling station after time lag of t1 as shown in FIG. 7 (A1). As shown in FIG. 7 (A2), after confirming carrier disconnection during time period Δt from a point H in time when the reception of the DIS signal is completed, the calling station transmits a DCS signal to the called station and the DCS signal will reach the called station after time lag of t2. It should however be noted that an echo signal of the DIS signal, which is generated at the calling station, will reach the called station after time lag of t2, as shown in FIG. 7 (B2). It usually holds that t1=t2. As is obvious from FIG. 7 (B2), since the DIS echo and DCS signals travel along the same transmission line and they are equally delayed, the DCS signal will reach the called station after the DIS echo signal.

Under the condition, if the called station accepts a receiving signal at time G when the sending of a DIS signal is completed, the called station will move into step 16 of FIG. 3 thereby regarding the frame contents of the DIS echo signal as information from the calling station. In the case of absence of an original document to be transmitted, the called station will send out a DCN signal to disconnect the transmission line; on the other hand, if an original document exists, the called station sends out a DCS signal, followed by the step of phase-adjustment and training. In any event, the calling station will incur a false operation because the transmission line is suddenly disconnected despite the fact that a DCS signal has been sent out, or training is requested after the DCS signal. An echo signal received at the called station will be accepted as a normal facsimile signal as long as it has a level in the range between 0 and 40 dbm as recommended by CCITT. Since such an echo signal is accepted and processed prior to the arrival of a normal DCS signal, the transmission line will be disconnected upon completion of communication without reception of the normal DCS signal subsequent thereto.

SUMMARY OF THE INVENTION

A primary object of the present invention is to provide an improved facsimile communication method.

Another object of the present invention is to provide a facsimile communication method capable of preventing the occurrence of a false operation due to an echo signal.

A further object of the present invention is to provide a facsimile communication method for transmitting and receiving data in the form of preamble-preceded frames whereby the total time length of a preamble-preceded frame which is being transmitted is controlled to be longer than a predetermined time length to avoid an influence of its echo signal.

A still further object of the present invention is to provide a facsimile communication method particularly suited for transmitting digital data through the public telephone lines.

A still further object of the present invention is to provide an improved facsimile communication method simple in structure and easy to be applied.

These and other objects are attained, in accordance with one aspect of the present invention, by a facsimile communication method for transmitting and receiving data in the form of preamble-preceded frames in which a frame is allowed to be received only when its preceding preamble has been received prior thereto, said method comprising the steps of: transmitting a preamble-preceded frame and at the same time measuring the time length of said preamble-preceded frame; comparing the measured time length of said preamble-preceded frame with a predetermined time length when said transmitting step is completed; and adding one or more flags to the end of said preamble-preceded frame until said predetermined time length is reached only when said measured time length is shorter than said predetermined time length, thereby preventing an echo signal of said preamble-preceded frame from being received.

Other objects, advantages and novel features of the present invention will become apparent from the following detailed description of the invention when considered in conjunction with the accompanying drawings.

BRIEF DESCRIPTION OF THE DRAWINGS

FIG. 1b is a timing chart showing a variation of FIG. 1a;

DESCRIPTION OF THE PREFERRED EMBODIMENTS

Figure 7:
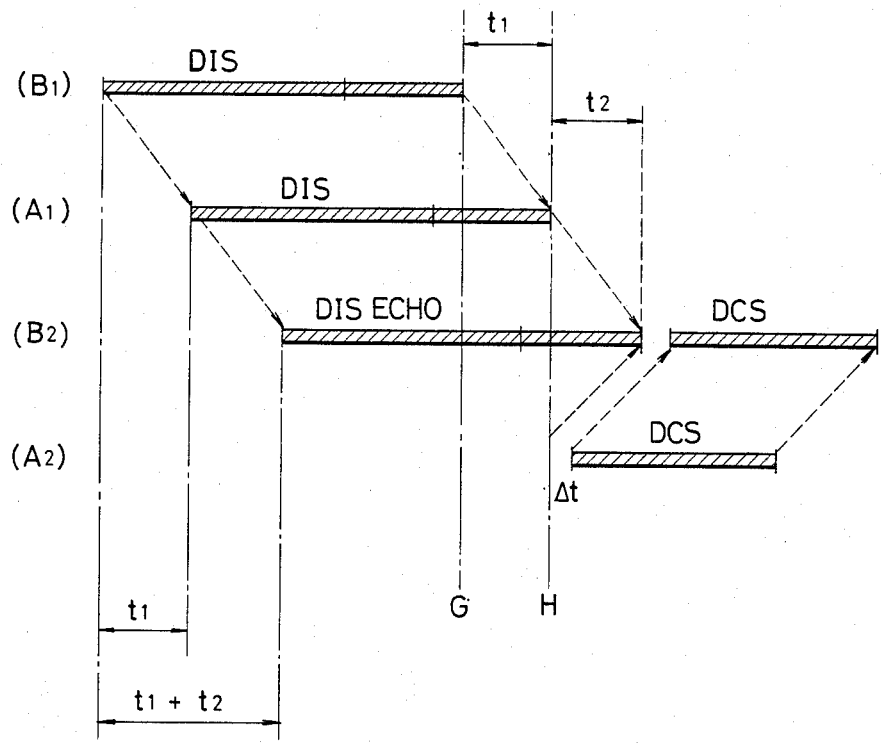
FIG. 7 is a timing chart showing the time-relationship of the DIS echo signal with respect to its original DIS signal and the DCS signal, which is a response of the original DIS signal.

It has been confirmed by observing signals actually transmitted through the transmission lines that the echo delay time (t1+t2) shown in FIG. 7 has a maximum value of 2.4 seconds. It has also been confirmed through actual observations that when an echo signal is generated, as long as the calling station sends out a DCS signal upon carrier disconnection of the DIS signal, the DCS signal reaches the called station only after the DIS echo signal having reached the called station. The facsimile communication method of the present invention is so structured that frame reception is not carried out unless a preamble has been received prior thereto. That is, in accordance with the present invention, the length of a control signal is controlled by adding an insignificant code such as a flag such that the station which sends out a signal does not receive a frame until the preamble of its echo signal has passed therethrough.

As described above, since the maximum delay time of an echo signal is 2.4 seconds and the length in time of the preamble is 1 second, in order to make such that frame reception takes place only after passage of the preamble of the returning echo, it is only necessary to structure such that a receiving frame is accepted only after elapsing 3.4 seconds (2.4 seconds of the echo delay +1 second of the preamble) as from the start of sending out a control signal. In other words, a false operation due to an echo signal may be avoided by controlling the length of a control signal including a preamble and a frame to be 3.4 seconds or more. Such a control signal may have a plurality of frames arranged one after another preceded by a preamble in the form of a string of data. If the total length in time of such a control signal is shorter than a predetermined value, e.g., 3.4 seconds in the preferred embodiment, a flag having the code of "01111110" is added to the end of the frame and a number of such flags are added, if necessary, thereby making the total length of the control signal longer in time than a predetermined value. It is to be noted that a preamble may also be formed by a series of such a flag.

Figure 8:
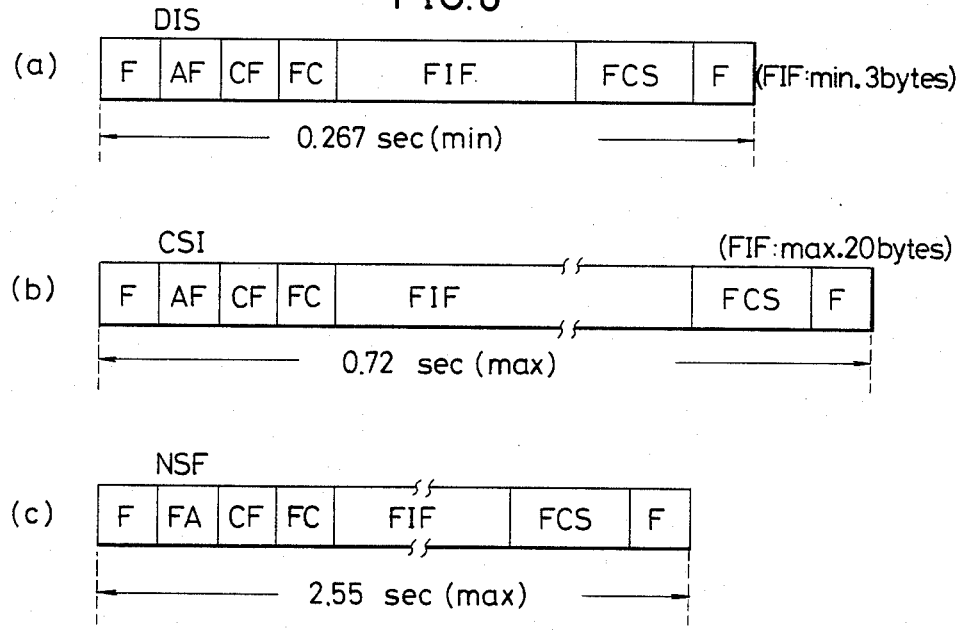
FIG. 8 shows the structure and length in time of each of the frames for DIS, CSI and NSF signals.

FIG. 8 shows the structure and the typical length in time of several signals. As shown, the frame of a DIS signal has a minimum length of 0.267 sec.; the frame of a CSI signal has a maximum length of 0.72 sec.; and the frame of a NSF signal has a maximum length of 2.55 sec. As set forth above, these and other signals are combined one after another to form a string of data, which, in turn, is preceded by a preamble to form a control signal or a unit of data to be transmitted. If the total length in time of such a control signal is less than a predetermined value, e.g., 3.4 seconds in a preferred embodiment, an appropriate number of flags as required are added at the end.

In one form of the present invention, use may be made by a timer which starts its operation upon initiation of sending out of a control signal. Then upon completion of sending out of a control signal, if the timer indicates time-over, then no anti-echo operation needs to be carried out; on the other hand, if the timer is still in progress, then one or more flags are added immediately after the frame until the timer indicates time-over. For example, if the timer is to count 3.7 seconds and the control signal has a DIS signal of 0.267 seconds, and since the length in time of a preamble is 1 second, so many flags are required to fill the length in time as calculated below.

$$3.7-(1.0+0.267)=2.4 \text{ seconds}$$

Figure 9:
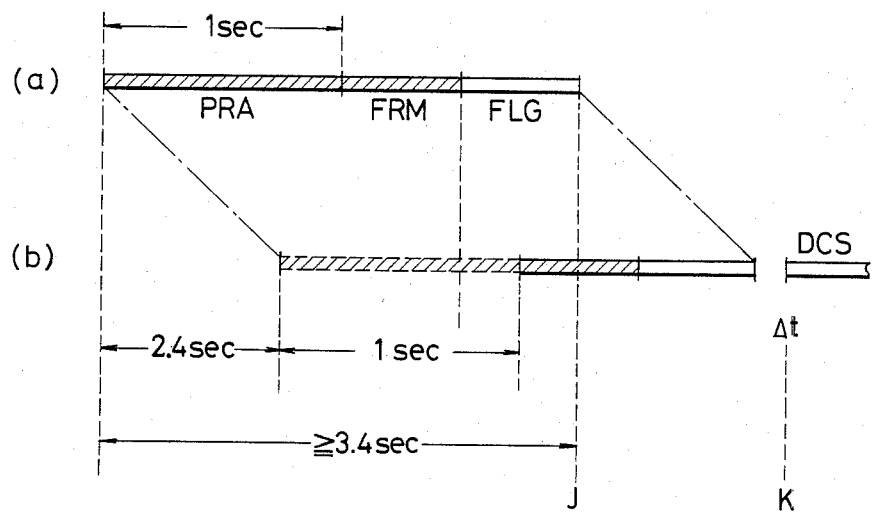
FIG. 9 is a timing chart showing the sequence of facsimile communication in accordance with the present invention.

FIG. 9 is a timing chart showing one embodiment of the present facsimile communication method. As shown, when a frame FRM is to be sent out, it is preceded by a preamble PRA and, if necessary, followed by a flag FLG, thereby controlling the total length in time of a unit of data to be transmitted to be 3.4 seconds or more. If the frame FRM is 2.4 seconds or more, no flag FLG needs to be added. If the timer is set to count 3.7 seconds, addition of a flag or flags is required only when the length of a frame is shorter than 2.7 seconds.

As shown in FIG. 9, when a control signal is sent out from a certain station, its echo signal returns to the station in 2.4 seconds at the latest. At the time when the head of the preamble of the echo signal has reached, the station is still in the progress of sending out the signal, so that the preamble of the echo signal is not accepted. The station will accept the reception of a signal when time J corresponding to the tail end of the flag FLG has been reached. It should, however, be noted that the preamble of the echo signal has already passed through the station at time J. Thus, at this time, even if the station is ready to receive a signal, the station does not receive the echo signal because the present facsimile communication method is so structured that a signal or frame is received only when its preamble has been received. As a result, the station will start to receive the preamble of a response signal, e.g., DCS signal, transmitted from the other station to be communicated at time K, so that the frame of the response signal will be duly received.

Figure 10:
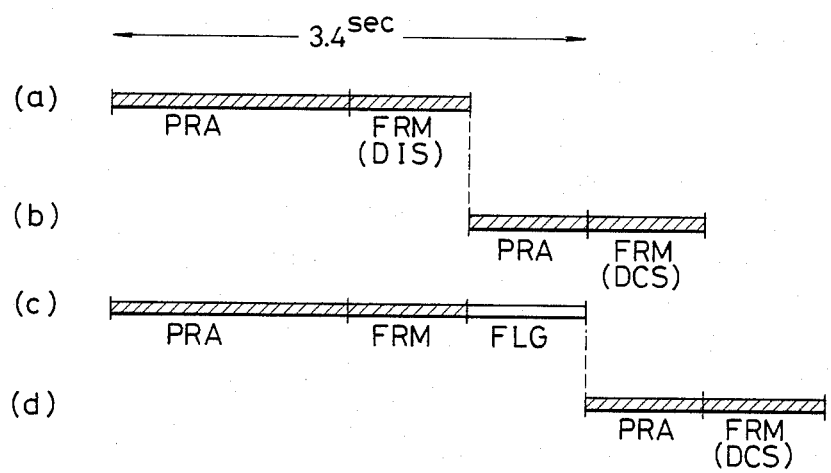
FIG. 10 is a timing chart showing the sequence of facsimile communication in accordance with the present invention when an echo signal is absent.

Referring now to FIG. 10, a description will be made as to the case where no echo signal exists. It will be understood that the facsimile communication scheme illustrated in FIG. 9 is advantageous for the case in which an echo signal is produced such as in a long-distance facsimile communication, and in the case of a short-distance facsimile communication in which no significant delay in signal is present as shown in FIG. 10, it is preferable that no flag is added to the end of the frame. In the latter case, the timer may be set to count the combined time span of a preamble and a frame, or the timer may be set inoperative to prohibit the addition of a flag. Accordingly, time Δt for confirmation of carrier disconnection upon completion of reception of the control signal which includes a DIS frame, the other station to be communicated will send out a response signal which includes a preamble and a DCS frame immediately, as shown in FIG. 10(b). The calling station which sent out the DIS signal is set ready to receive a signal substantially at the time of completion of sending out the frame, so that it can immediately detect the preamble of a response signal from the called station and thus it can receive the DCS frame of the response signal.

Even in a short-distance facsimile communication, the total length in time of a signal or unit of data to be transmitted may be controlled to be a predetermined value, preferably 3.4 seconds or more. This mode is shown in FIG. 10(c), in which a flag FLG is added to the end of the frame FRM. Also in this case, upon completing the reception of the frame from the calling station, the called station will return a response signal including DIS after confirming carrier disconnection for time period $\Delta t$, and, therefore, the called station can receive the preamble PRA of the response signal right from the beginning so that the DCS frame subsequent thereto may also be received duly, as shown in FIG. 10(d). In this case, however, the communication period is somewhat prolonged.

Figure 1A:
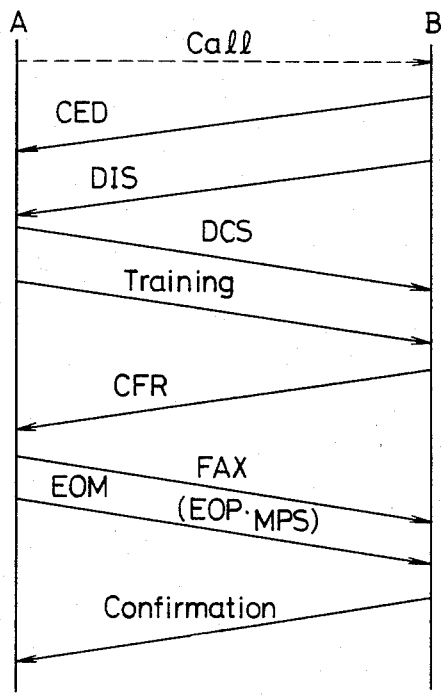
FIG. 1a is a timing chart showing the sequence of transmission procedure in accordance with facsimile communication.
Figure 1B:
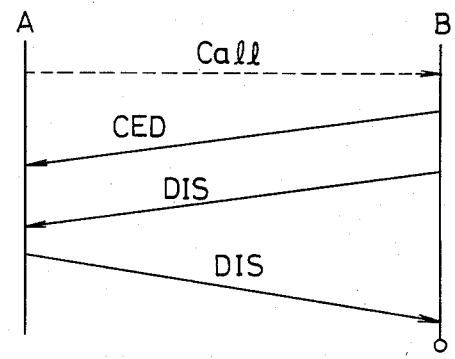
Figure 2:
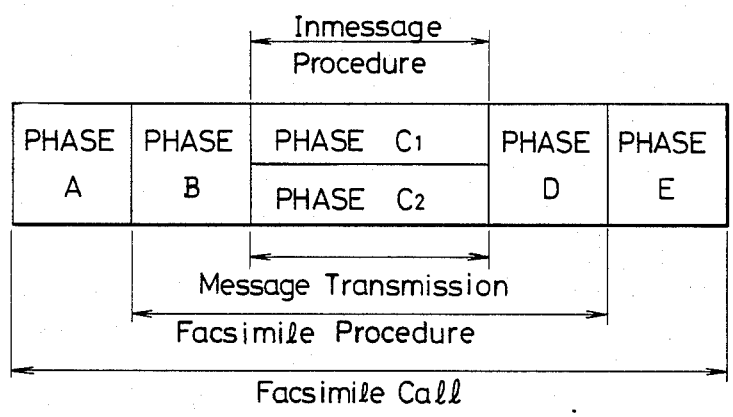
FIG. 2 is an illustration showing basic phases in facsimile communication.
Figure 3:
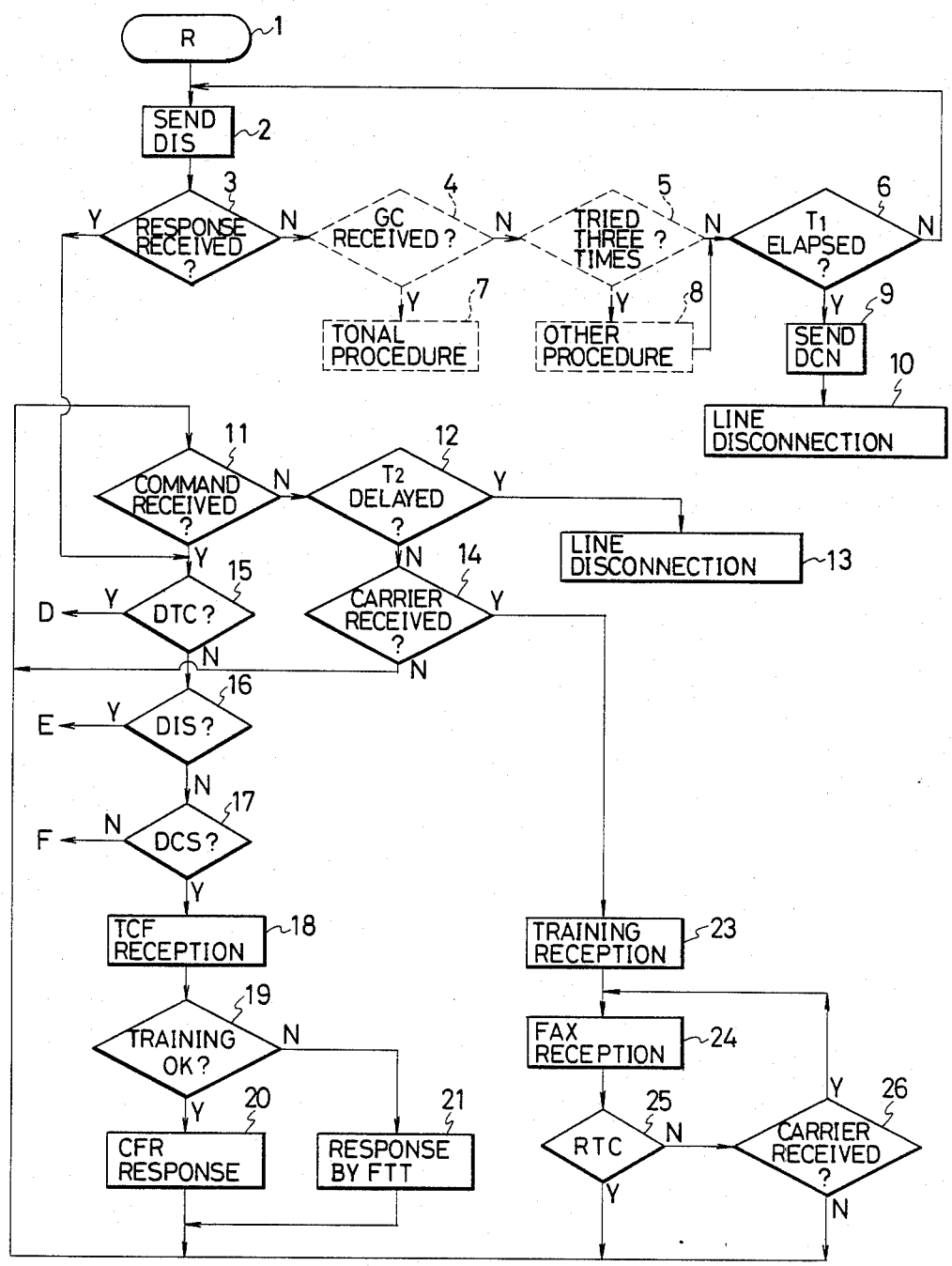
FIG. 3 is a flow chart showing sequential steps in phases B and C at the receiver side in the facsimile control procedure.
Figure 4:
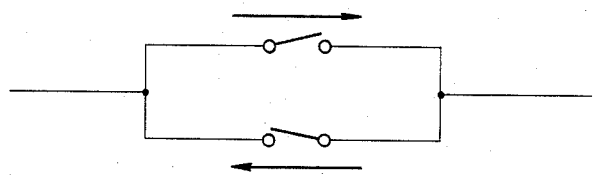
FIG. 4 is a schematic illustration showing the structure of an echo suppressor.
Figure 5:
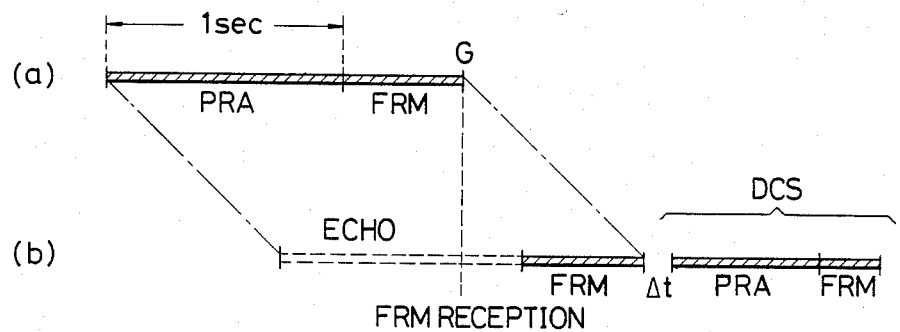
FIG. 5 is a timing chart showing the case in which a false operation is induced by an echo signal.
Figure 6:
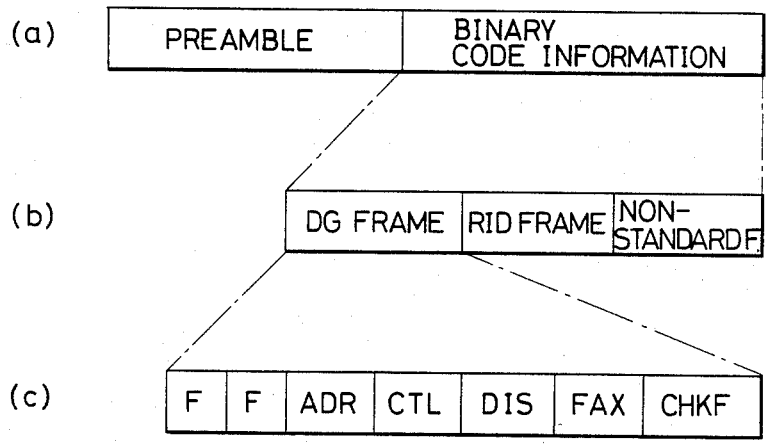
FIG. 6 is an illustration showing the structure of a binary code signal to be used in facsimile communication.
Figure 11:
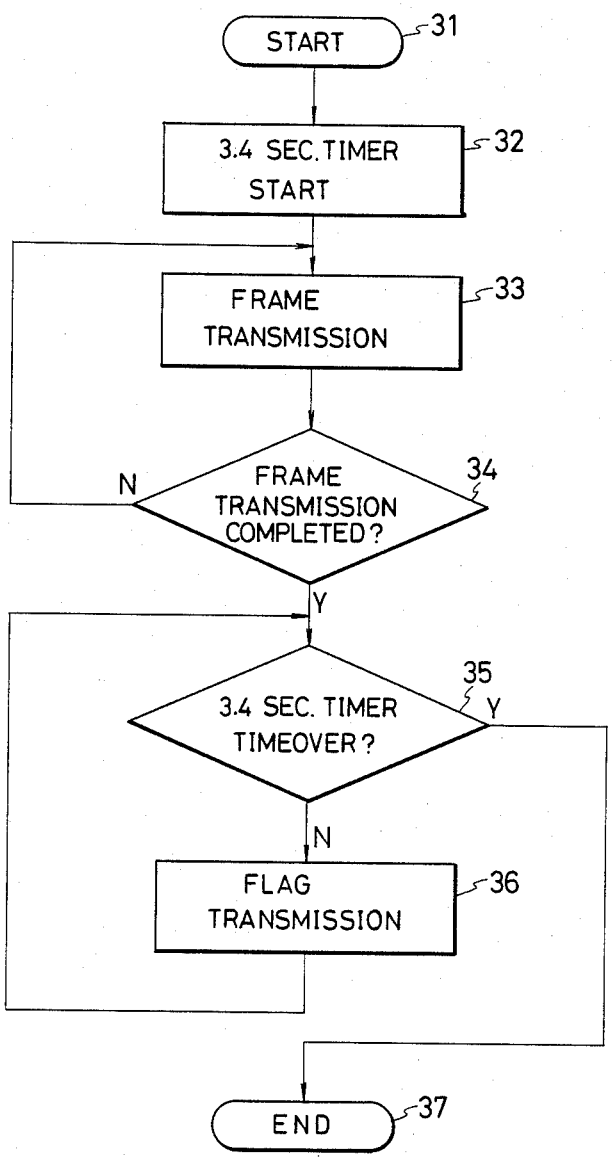
FIG. 11 is a flow chart showing detailed steps in accordance with one embodiment of the present invention.

FIG. 11 is a flow chart showing the sequence of steps in accordance with the embodiment of the present invention and these steps 31 through 37 are to be entered into the flow chart of FIG. 3 in place of step 2 therein.

For example, in the case where the called station is to send out a DIS signal after call establishment, it causes a 3.4 sec. timer to start at step 32 and at the same time it starts to send out a DIS signal comprised of a preamble and a DIS frame at step 33. Then, it is checked as to whether the frame transmission is completed at step 34 and, if completed, it is checked as to whether the 3.4 sec. timer is time-over at step 35. If time-over is indicated, it proceeds to step 37; whereas, if time-over is not indicated, it proceeds to step 36 to send out a flag and this procedure will be repeated until the timer indicates time-over.

The above description concerning the flow chart of FIG. 11 has been made with reference to the case where the called station sends out a DIS signal, which is the case where an erroneous operation is most likely to occur. It should however be noted that the present invention is not limited to this special case, but it is equally applicable to any of the stations to be communicated and to the case of sending any signal.

As described in detail above, in accordance with the present invention, the length in time of a signal or frame is measured as the signal is being sent out and one or more flags are added to the signal if it is shorter than a predetermined value to control the total length of the signal. Thus, when the station sending out the signal is set ready to receive a response signal, the preamble of an echo signal has already passed through the station without having been received. Accordingly, since an echo signal is not accepted, a false operation due to an echo signal is completely prevented from occurring.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A facsimile communication method for preventing receipt of an echo of data being transmitted by ensuring that an echo returns only while transmission of data is in progress, said method being for transmitting and receiving data in the form of preamble-preceded frames in which a frame is allowed to be received only when its preceding preamble has been received prior thereto, said method comprising the steps of:
   transmitting a preamble-preceded frame and at the same time measuring a time length of transmitting said preamble-preceded frame;
   comparing the measured time length of transmitting said preamble-preceded frame with a predetermined time length when said transmitting step is completed; and
   adding one or more flags to the end of said preamble-preceded frame until the frame time length exceeds the predetermined time length only when said measured time length is shorter than said predetermined time length, thereby preventing an echo of said preamble-preceded frame from being received.

2. The method of claim 1 wherein said data is a digital data and said flag is formed by a digital code.

3. The method of claim 2 wherein said flag is formed by a code of "01111110" and said preamble is formed by a collection of said flags.

4. The method of claim 1, 2, or 3 wherein said preamble has a time length of 1 second and said predetermined time length is set at 3.4 seconds or more.

5. The method of claim 1, 2 or 3 wherein said preamble-preceded frame comprises a preamble and an appropriate number of frames arranged one after another immediately following said preamble in the form of a string of data.

* * * * *